(12) United States Patent
Chen et al.

(10) Patent No.: US 8,791,912 B2
(45) Date of Patent: Jul. 29, 2014

(54) DISPLAY SYSTEM AND METHOD

(75) Inventors: Yen-Wen Chen, Taoyuan County (TW); I-Hsuan Peng, Taoyuan County (TW); Yen-Yin Chu, Kaohsiung (TW)

(73) Assignee: National Central University, Taoyuan County (TW)

( * ) Notice: Subject to any disclaimer, the term of this patent is extended or adjusted under 35 U.S.C. 154(b) by 227 days.

(21) Appl. No.: 13/284,986

(22) Filed: Oct. 31, 2011

(65) Prior Publication Data

US 2013/0027321 A1    Jan. 31, 2013

(30) Foreign Application Priority Data

Jul. 29, 2011 (TW) .............................. 100127082 A (51) Int. Cl.
*G06F 3/041* (2006.01)
*G06F 3/0488* (2013.01)

(52) U.S. Cl.
CPC .................................. *G06F 3/04883* (2013.01)
USPC ........................................................ 345/173

(58) Field of Classification Search
None
See application file for complete search history.

(56) References Cited

U.S. PATENT DOCUMENTS

| | | | | |
|---|---|---|---|---|
| 4,878,086 A * | 10/1989 | Isohata et al. | ................... | 355/77 |
| 8,228,307 B2 * | 7/2012 | Lo | ................... | 345/173 |
| 8,280,446 B2 * | 10/2012 | Hong et al. | ................... | 455/566 |
| 8,378,978 B2 * | 2/2013 | Lee | ................... | 345/173 |
| 2003/0071832 A1 | 4/2003 | Branson | | |
| 2005/0083331 A1 | 4/2005 | MacKinlay | | |
| 2005/0134693 A1 | 6/2005 | Torimoto et al. | | |
| 2005/0259084 A1 * | 11/2005 | Popovich et al. | ............. | 345/173 |
| 2008/0132285 A1 * | 6/2008 | Kwak et al. | ................... | 455/566 |
| 2009/0197648 A1 * | 8/2009 | Cheon et al. | ................... | 455/566 |
| 2009/0295740 A1 * | 12/2009 | Lee | ................... | 345/173 |
| 2010/0073314 A1 * | 3/2010 | Lo | ................... | 345/173 |
| 2011/0122080 A1 | 5/2011 | Kanjiya | | |

FOREIGN PATENT DOCUMENTS

| CN | 201153023 Y | 11/2008 |
|---|---|---|
| TW | M262797 | 4/2005 |

* cited by examiner

*Primary Examiner* — David D Davis
(74) *Attorney, Agent, or Firm* — CKC & Partners Co., Ltd.

(57) ABSTRACT

A display system is disclosed. The display system includes several electrical apparatuses and a display control unit. The display control unit builds connections with the electrical apparatuses. The display control unit includes an information generating module and a display driving module. When the display system is in a combination display mode, the information generating module detects and generates combination information about combination relations among the display units of the electrical apparatuses. The display driving module drives each of the display units to display a corresponding image block according to the combination information. Hence, the displayed corresponding image blocks can be combined to form an entire image. A display method is also disclosed.

14 Claims, 6 Drawing Sheets

DISPLAY SYSTEM AND METHOD

RELATED APPLICATIONS

This application claims priority to Taiwan Application Serial Number 100127082, filed Jul. 29, 2011, which is herein incorporated by reference.

BACKGROUND

1. Technical Field

The present invention relates to a display system and method. More particularly, the present invention relates to a display system and method for combining several electrical apparatuses for display.

2. Description of Related Art

As 3C (Computer, Communications and Consumer) technology develops, there are more and more people utilizing handheld electrical apparatuses in their daily life. Some of the most common handheld electrical apparatuses include personal digital assistants (PDAs), mobile phones, and smart phones. As handheld electrical apparatuses are designed to increasingly smaller sizes to enable greater portability, more and more people are using handheld electrical apparatuses and more functions are being developed for different users.

To enhance portability, handheld electrical apparatuses are often equipped with small-sized display units. Since the display area of a handheld electrical apparatus is small, only a few people can clearly see the content displayed thereon. In other words, content displayed on a handheld electrical apparatus can not be shared for viewing by many users at the same time.

Hence, there is a need to provide electrical apparatuses with good portability but which can display content over a large enough area to allow for viewing by many users at the same time.

SUMMARY

According to one embodiment of this invention, a display system is provided to drive display units of electrical apparatuses to respectively display corresponding image blocks for forming an entire image according to the combination positions of the display units when the display system is in a combination display mode. The display system includes several electrical apparatuses and a display control unit. The display control unit builds connections with the electrical apparatuses. Each of the electrical apparatuses includes a display unit. The display control unit includes an information generating module and a display driving module. When the display system is in a combination display mode, the information generating module detects and generates combination information about combination relations among the display units of the electrical apparatuses. The display driving module drives each of the display units to display a corresponding image block according to the combination information. Hence, the displayed corresponding image blocks can be combined to form an entire image.

According to another embodiment of this invention, a display method is provided. In the display method, display units of electrical apparatuses respectively display corresponding image blocks for forming an entire image according to the combination positions of the display units when set to a combination display mode. The display method is implemented by a display system comprising several electrical apparatuses. Each of the electrical apparatuses includes a display unit. In the display method, when the display system is set to a combination display mode, combination information about combination relations among the display units of the electrical apparatuses is detected and generated. Each of the display units displays a corresponding image block according to the combination information. Hence, the displayed corresponding image blocks can be combined to form an entire image.

According to another embodiment of this invention, a display system is provided to make an interaction apparatus able to interact with a entire image, which is formed by combining display units of several electrical apparatuses. The display system includes several electrical apparatuses, a display control unit and at least one interaction apparatus. The display control unit builds connections with the electrical apparatuses. Each of the electrical apparatuses includes a display unit. When the display system is in a combination display mode, the display control unit drives the display units to respectively display a corresponding image block. Hence, the displayed corresponding image blocks can be combined to form a entire image. The interaction apparatus builds a connection with the display control unit. The interaction apparatus receives or transmits an interaction signal between the display control unit for interacting with the entire image.

The present invention can achieve many advantages. Several electrical apparatuses with small display units can be combined in any order to form a large display size. Hence, it is convenient for several persons to watch content displayed with the large display size. In one scenario of this invention, users can respectively provide their own electrical apparatuses for forming the large display size.

These and other features, aspects, and advantages of the present invention will become better understood with reference to the following description and appended claims. It is to be understood that both the foregoing general description and the following detailed description are by examples, and are intended to provide further explanation of the invention as claimed.

BRIEF DESCRIPTION OF THE DRAWINGS

The invention can be more fully understood by reading the following detailed description of the embodiments, with reference made to the accompanying drawings as follows.

DETAILED DESCRIPTION

Reference will now be made in detail to the present embodiments of the invention, examples of which are illustrated in the accompanying drawings. Wherever possible, the same reference numbers are used in the drawings and the description to refer to the same or like parts.

Figure 1:
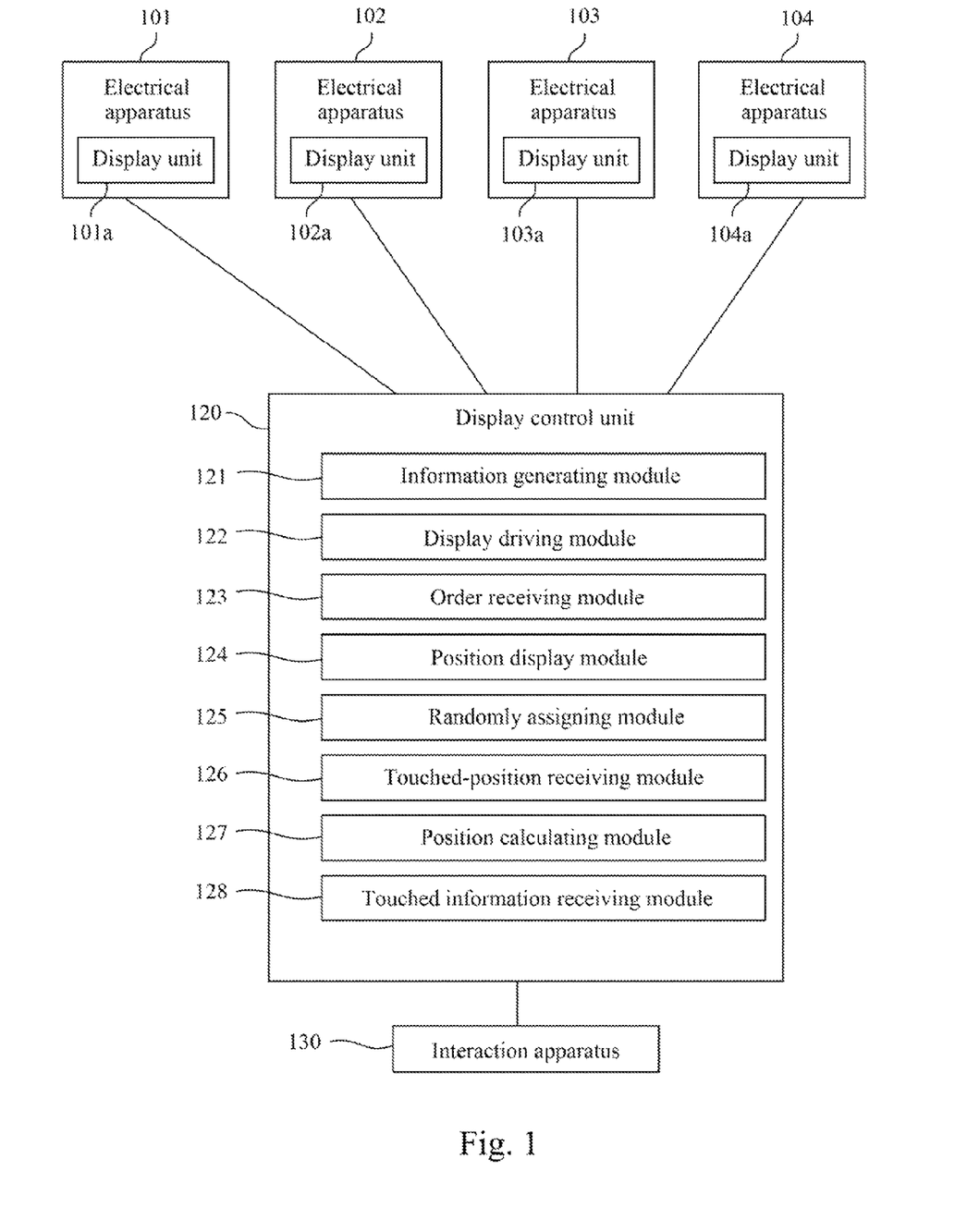
FIG. 1 is a block diagram of a display system according to an embodiment of this invention.

Referring to FIG. 1, a block diagram will be described that illustrates a display system according to an embodiment of this invention. The display system drives display units of electrical apparatuses to respectively display corresponding image blocks for forming an entire image according to combination positions of the display units when the display system is in a combination display mode.

The display system includes several electrical apparatuses 101, 102, 103, 104 and a display control unit 120. The display control unit 120 builds connections with the electrical apparatuses 101, 102, 103, 104. Each of the electrical apparatuses 101, 102, 103, 104 includes a display unit 101a, 102a, 103a, 104a. In one embodiment, the display sizes of the display units 101a, 102a, 103a, 104a are all the same. In another embodiment, the display sizes of some of the display units 101a, 102a, 103a, 104a are the same. In another embodiment, the display sizes of the display units 101a, 102a, 103a, 104a are different. In addition, the display units 101a, 102a, 103a, 104a may be polygonal (for example, rectangular) in shape. Furthermore, in other embodiments, the display system can include different numbers of electrical apparatuses, each of the electrical apparatuses can include more than one display unit, and the number of the display units included in each of the electrical apparatuses can be different, which should not be limited in this disclosure.

In one embodiment of this invention, the display control unit 120 may be a control unit of an independent apparatus, and the display control unit 120 builds connections with the electrical apparatuses 101, 102, 103, 104 through a wireless communication interface, such as Bluetooth®, Infrared Data Association (IrDA®), IEEE 802.11 series, Wi-Fi®, ZigBee® or any other wireless communication interface. In another embodiment of this invention, the display control unit 120 may be simulated utilizing the calculation resources of the electrical apparatuses 101, 102, 103, 104. In other embodiments, the display control unit 120 can be implemented utilizing other methods, which should not be limited in this disclosure.

The display control unit 120 includes an information generating module 121 and a display driving module 122. When the display system is in a combination display mode, the information generating module 121 detects and generates combination information about combination relations among the display units 101a, 102a, 103a, 104a of the electrical apparatuses 101, 102, 103, 104. Subsequently, the display driving module 122 drives each of the display units 101a, 102a, 103a, 104a to display a corresponding image block according to the combination information. Hence, the corresponding image blocks displayed on the display units 101a, 102a, 103a, 104a can be combined to form an entire image.

Figure 2A:
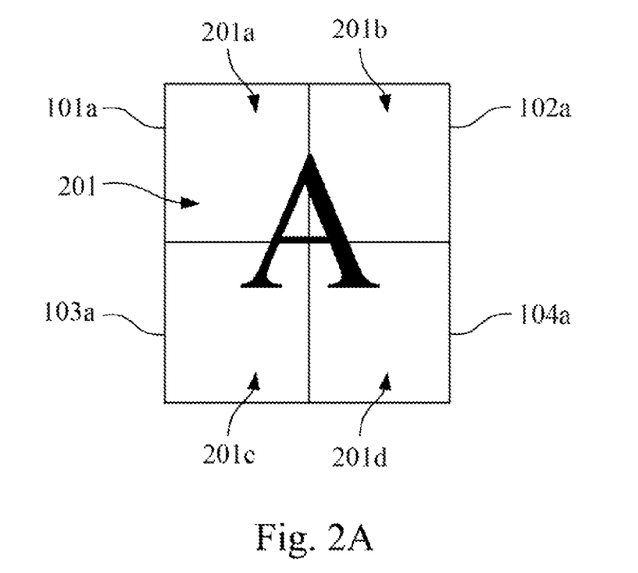
FIG. 2A illustrates an example of how electrical apparatuses of the display system of FIG. 1 can be combined in a combination display mode.

FIG. 2A illustrates an example of how the display units 101a, 102a, 103a, 104a of the electrical apparatuses 101, 102, 103, 104 of the display system can be combined in the combination display mode in FIG. 1. For example, the display driving module 122 drives each of the display units 101a, 102a, 103a, 104a to respectively display corresponding image blocks 201a, 201b, 201c, 201d according to the combination information to form an entire image 201. Therefore, several electrical apparatuses with small display units can be combined to form a large display size, such that it is convenient for several persons to watch content displayed with the large display size.

Figure 2B:
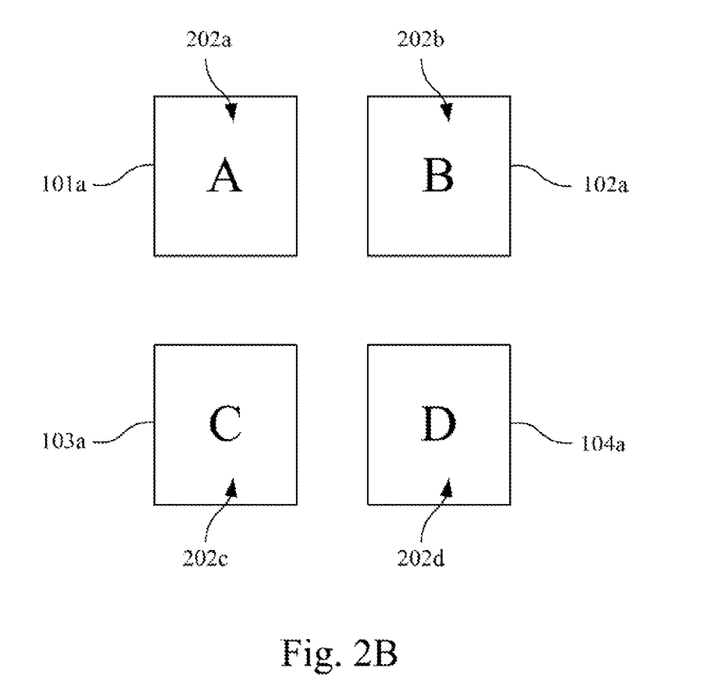
FIG. 2B illustrates an example of how the electrical apparatuses of the display system of FIG. 1 display images independently in an independent display mode.

When the display system is in an independent display mode, each of the display units 101a, 102a, 103a, 104a of the electrical apparatuses 101, 102, 103, 104 displays an independent image. FIG. 2B illustrates an example of how the display units 101a, 102a, 103a, 104a of the electrical apparatuses 101, 102, 103, 104 of the display system display images independently in the independent display mode in FIG. 1. When the display system is in the independent display mode, the display units 101a, 102a, 103a, 104a respectively display independent images 202a, 202b, 202c, 202d. In other words, when the display system is in the independent display mode, each of the electrical apparatuses 101, 102, 103, 104 can display its own image.

In one embodiment of this invention, the combination information can be generated according to the received order of signals received from the electrical apparatuses 101, 102, 103, 104. Hence, the display control unit 120 may further include an order receiving module 123. When the display system is in the combination display mode, the order receiving module 123 receives a confirm signal from each of the electrical apparatuses 101, 102, 103, 104. Hence, the information generating module 121 generates the combination information according to a receiving order of the confirm signals received from the electrical apparatuses 101, 102, 103, 104. For example, the information generating module 121 may assign the electrical apparatus 101, 102, 103 or 104, the confirm signal received from which is at the xth place, the xth position to generate the combination information. Therefore, users can operate the electrical apparatuses 101, 102, 103, 104 for generating confirm signals in the order of their combination positions, and based on this information, the information generating module 121 generates combination information.

In another embodiment of this invention, each of the electrical apparatuses 101, 102, 103, 104 may display a diagram, which shows several candidate positions for selection. Hence, the display control unit 120 may further include a position display module 124. When the display system is in the combination display mode, the position display module 124 drives each of the display units 101a, 102a, 103a, 104a of the electrical apparatuses 101, 102, 103, 104 to display a diagram, which shows several candidate positions. Subsequently, a select signal for selecting one of the candidate positions may be received from each of the electrical apparatuses 101, 102, 103, 104. Hence, the information generating module 121 generates the combination information according to the select signals.

Figure 3:
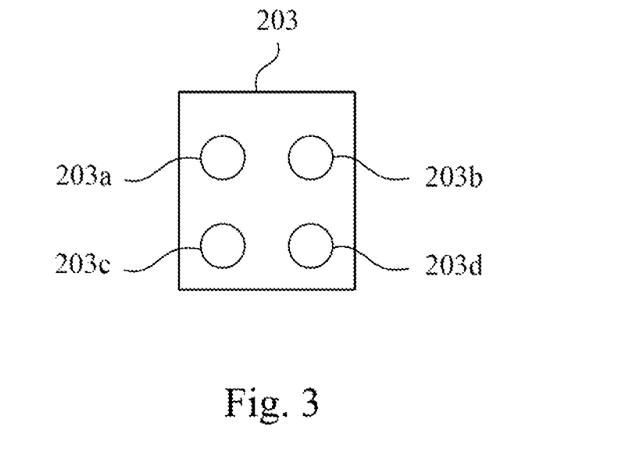
FIG. 3 illustrates a diagram which shows several candidate positions for selection and which is displayed by each electrical apparatus of the display system of FIG. 1.

FIG. 3 illustrates a diagram which shows several candidate positions for selection and which is displayed by each of the electrical apparatuses 101, 102, 103, 104 of the display system. The diagram 203 includes several candidate positions 203a, 203b, 203c, 203d, and each of the display units 101a, 102a, 103a, 104a can display the diagram 203 for selection. For example, a user can select the upper left position 203a through one of the electrical apparatuses 101, 102, 103 or 104 when it has been decided to place the same in the upper left corner, and as a result, the corresponding select signal is generated. Therefore, users can select the combination positions for the electrical apparatuses 101, 102, 103, 104 (i.e., the manner in which the positions are to be combined) in an easy way.

In another embodiment of this invention, the combination positions of the electrical apparatuses 101, 102, 103, 104 can be assigned randomly. Hence, the display control unit 120 may further include a randomly assigning module 125. When the display system is in the combination display mode, the randomly assigning module 125 randomly assigns a random combination position to each of the display units 101a, 102a, 103a, 104a. Subsequently, the information generating module 121 generates the combination information according to the random combination positions assigned to the display units 101a, 102a, 103a, 104a. Furthermore, the display units 101a, 102a, 103a, 104a may display the assigned combination positions so that users may subsequently place the electrical apparatuses 101, 102, 103, 104 in the correct positions.

In another embodiment of this invention, the display units 101a, 102a, 103a, 104a may be touch screens, and users can perform touch gestures that trace tracks, each across edge portions of the display units 101a, 102a, 103a, 104a of two neighboring electrical apparatuses 101, 102, 103, 104, and the information generating module 121 may generate the combination information using this touch gesture information. Hence, the display control unit 120 may further include a touched-position receiving module 126. When the display system is in the combination display mode, the touched-position receiving module 126 receives detection signals from the display units 101a, 102a, 103a, 104a and generates corresponding touch gesture signals which include times at which the touch gestures were made. Hence, using the touch gesture signals, the information generating module 121 generates the combination information by determining that touch gestures, which are made on two of the display units 101a, 102a, 103a, 104 at times close to each other, are neighboring to each other.

Figure 4:
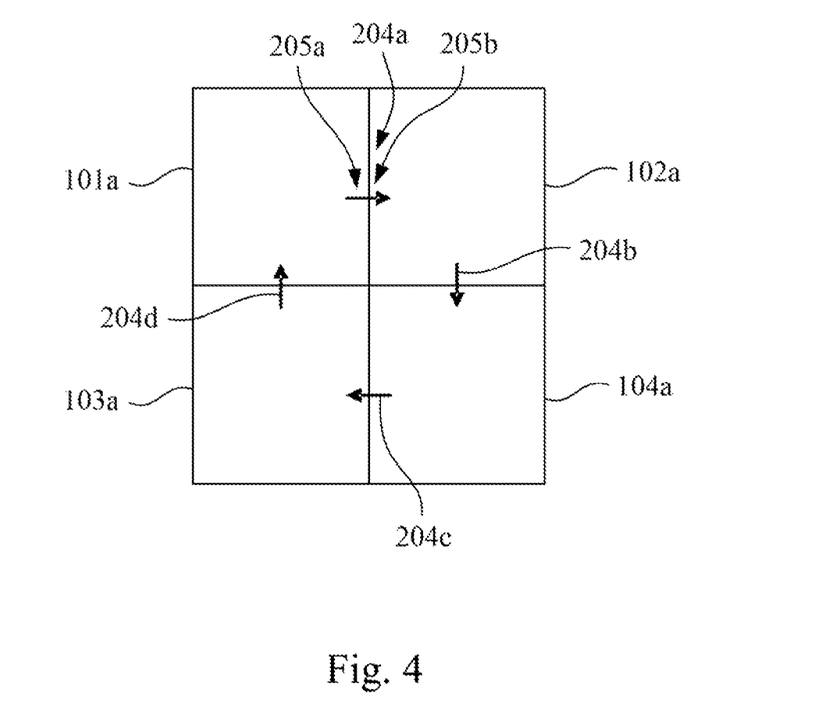
FIG. 4 illustrates a diagram showing how touch gestures may be made at edge portions of adjacent display units of the electrical apparatuses of the display system of FIG. 1 to generate combination information.

FIG. 4 illustrates a diagram showing how touch gestures may be made at edge portions of adjacent display units 101a, 102a, 103a, 104a of the electrical apparatuses 101, 102, 103, 104 of the display system to generate the combination information. After the display units 101a, 102a, 103a, 104a are put in a particular arrangement, tracks 204a, 204b, 204c, 204d are traced on the display units 101a, 102a, 103a, 104a, and the corresponding touch gesture signals are used to generate the combination information. For example, when the track 204a is traced, the display unit 101a may sense that the edge position 205a at its edge has been touched, and the display unit 102a may sense that the edge position 205b at its edge has been touched. Since the touched edge positions 205a, 205b are neighboring to each other, when the track 204a is traced, the times that the touched edge positions 205a, 205b are touched are close. Hence, the information generating module 121 may determine that the display units 101a, 102a are neighboring to each other and thereby generate the combination information using this determination information. Furthermore, the touched edge positions 205a, 205b can be utilized for alignment. Therefore, the corresponding positions for display between the display units 101a, 102a, 103a, 104a would be more precise.

Figure 5:
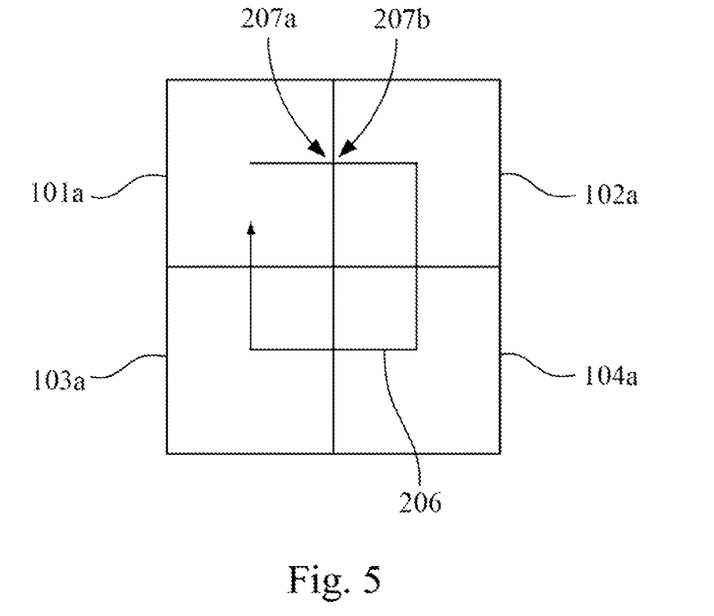
FIG. 5 illustrates a diagram showing how a touch gesture may be made in a rectangular motion over the display units of the electrical apparatuses of the display system of FIG. 1 to generate combination information.

FIG. 5 illustrates a diagram showing how a touch gesture may be made in a rectangular motion over the display units 101a, 102a, 103a, 104a of the electrical apparatuses 101, 102, 103, 103 of the display system to generate the combination information. After the display units 101a, 102a, 103a, 104a are put in a desired arrangements, a rectangular track 206 is traced on the display units 101a, 102a, 103a, 104a, and the corresponding touch gesture signals are used to generate the combination information. For example, when the track 206 is traced, the display unit 101a may sense that the edge position 207a at its edge has been touched, and the display unit 102a may sense that the edge position 207b at its edge has been touched. Since the touched edge positions 207a, 207b are neighboring to each other, when the track 206 is traced, the times that the touched edge positions 207a, 207b are touched are close. Hence, the information generating module 121 may determine that the display units 101a, 102a are neighboring to each other and thereby generate the combination information using the information of this determination. Furthermore, the touched edge positions 207a, 207b can be utilized for alignment.

In another embodiment of this invention, after the electrical apparatuses 101, 102, 103, 104 are put in a desired arrangement, information about which edges of the electrical apparatuses 101, 102, 103, 104 are touched is provided to the information generating module 121 for generating the combination information. Hence, the display control unit 120 may further include a touched information receiving module 128. When the display system is in the combination display mode, the touched information receiving module 128 receives information about touched edges of the electrical apparatuses 101, 102, 103, 104. The touched-edge information may include the identification information of touched edges of the electrical apparatuses 101, 102, 103, 104. Subsequently, the information generating module 121 generates the combination information according to the touched-edge information. In other words, users only have to put the electrical apparatuses 101, 102, 103, 104 in a desired arrangement with the edges of the electrical apparatuses 101, 102, 103, 104 touching each other for generating the combination information.

Figure 6:
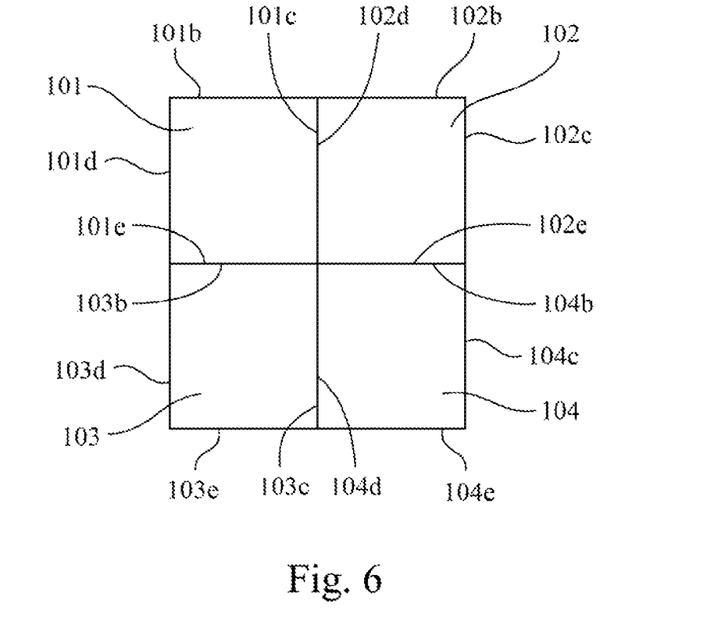
FIG. 6 illustrates a diagram showing how the electrical apparatuses of the display system of FIG. 1 are placed in a desired arrangement to generate combination information.

FIG. 6 illustrates a diagram showing how the electrical apparatuses 101, 102, 103, 104 of the display system are placed in a desired arrangement to generate the combination information. Touch sensing units may be disposed on the edges 101b, 101c, 101d, 101e of the electrical apparatus 101, the edges 102b, 102c, 102d, 102e of the electrical apparatus 102, the edges 103b, 103c, 103d, 103e of the electrical apparatus 103, and the edges 104b, 104c, 104d, 104e of the electrical apparatus 104. The touch sensing units may be electricity-conducted metal, short range wireless transmission units (such as IrDA® units) or any other unit for sensing touch. For example, since the edges 101c and 101e of the electrical apparatus 101 are touched, the touched-edge information may include the identification information of touched edges 101c and 101e of the electrical apparatus 101. Hence, since the electrical apparatus 101 is touched at the right edge 101c and the lower edge 101e, the information generating module 121 determines that the electrical apparatus 101 is placed in the upper-left corner, and uses this information to generate corresponding combination information. Furthermore, the identification information of the electrical apparatuses 102, 103, which touch the edges of the electrical apparatus 101, may be further received for generating the combination information.

In addition, a touched position in relation to the entire image may be calculated according to an actually touched position on the display units 101a, 102a, 103a, 104a. Hence, the display control unit 120 may further include a position calculating module 127. When the display system is in the combination display mode and one of the display units 101a, 102a, 103a, 104a is touched, the touched-position receiving module 126 receives an actually touched position of the touched display unit 101a, 102a, 103a, 104a. The position calculating module 127 then calculates a touched position in relation to the entire image according to the information of the touched display unit 101a, 102a, 103a, 104a, the combination information and the actually touched position.

Figure 7:
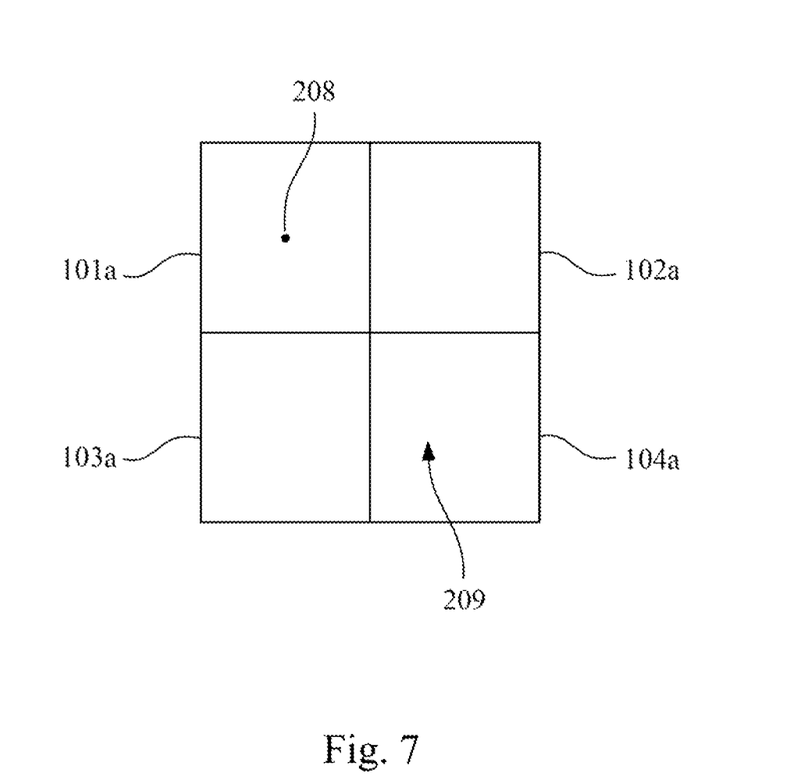
FIG. 7 illustrates a diagram showing how an actually touched position is made on one of the display units of the electrical apparatuses of the display system of FIG. 1 for use in determining a touched position in relation to an entire image.

FIG. 7 illustrates a diagram showing how an actually touched position is made on one of the display units 101a, 102a, 103a, 104a of the display system of FIG. 1 for use in determining a touched position in relation to the entire image. For example, if an actually touched position 208 of the display unit 101a is touched when the display system is in the combination display mode, the touched-position receiving module 126 receives information of the actually touched position 208 of the touched display unit 101a. Subsequently, according to the information of the touched display unit 101a, the combination information and the actually touched position 208, the position calculating module 127 calculates that the touched position in relation to the entire image is that corresponding to the left upper area of the entire image. Therefore, users can touch the entire image displayed by several small-sized display units for operation. In other embodiments, the touched-position receiving module 126 may receive several actually touched positions to provide for the position calculating module 127 for calculation, which should not be limited in this disclosure.

In addition, another apparatus can be interacted with the entire image displayed by the display units 101a, 102a, 103a, 104a. Hence, the display system may further include at least one interaction apparatus 130. The interaction apparatus 130 may build a connection with the electrical apparatuses 101, 102, 103, 104 through a wireless communication interface, such as Bluetooth®, Infrared Data Association (IrDA®), IEEE 802.11 series, Wi-Fi®, ZigBee® or any other wireless communication interface. Hence, the interaction apparatus 130 can receive an interaction signal from the display control unit 120 or transmit an interaction signal to the display control unit 120 for interacting with the entire image. In one scenario of this invention, a user can use the interaction apparatus 130 to interact with an entire image displayed utilizing the combination of the display units 101a, 102a, 103a, 104a for an interactive game. For example, when an interactive game, such as Bridge Card, Laying Out Sevens, Mahjong or any other interactive game, is being played, the interaction apparatus 130 may display cards on a user's hand, and the entire image displayed utilizing the combination of the display units 101a, 102a, 103a, 104a may display cards on the table. In other embodiments, the interaction apparatus 130 may interact with the entire image combined utilizing other methods, which should not be limited in this disclosure.

Figure 8:
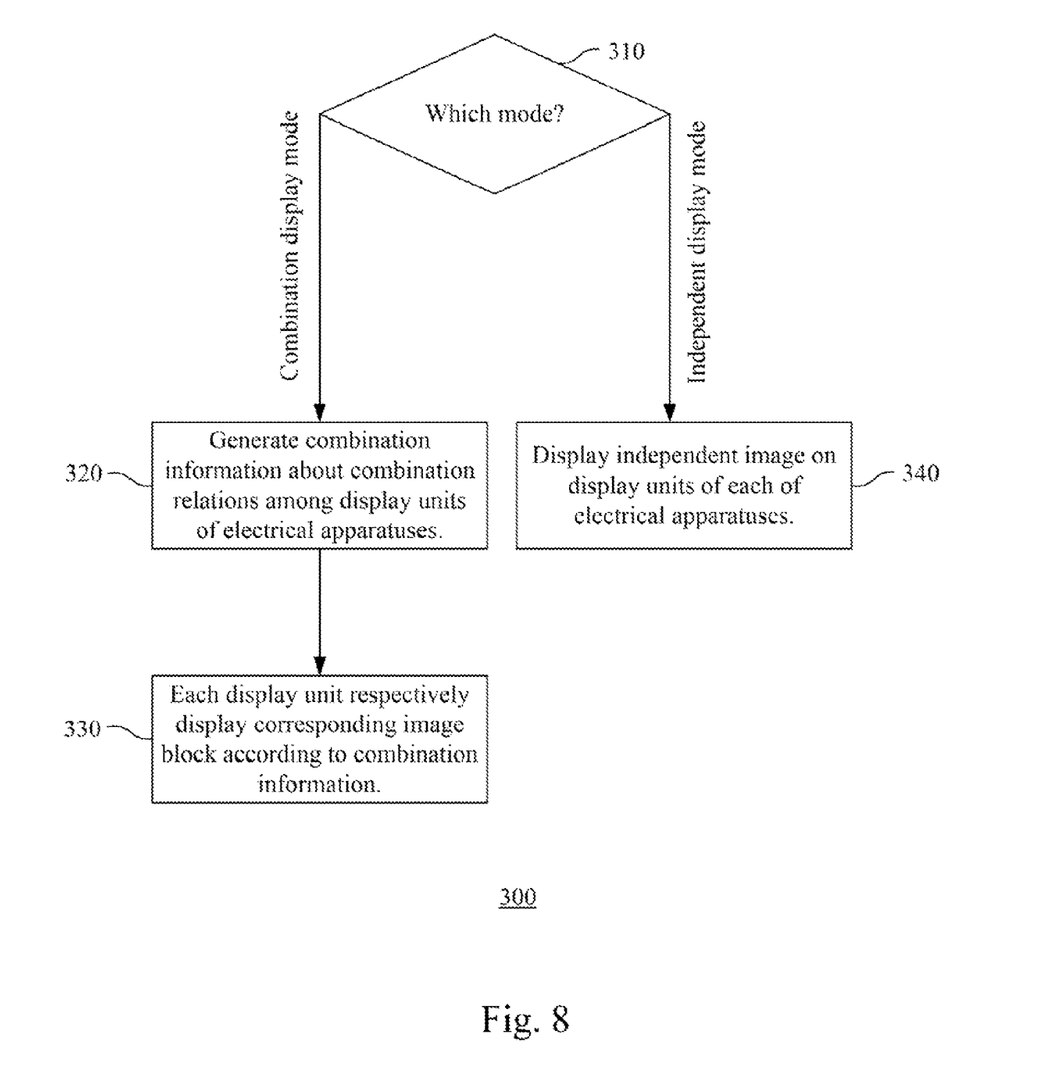
FIG. 8 is a flow diagram of a display method according to one embodiment of this invention.

Referring to FIG. 8, a flow diagram will be described that illustrates a display method according to one embodiment of this invention. In the display method, display units of electrical apparatuses of a display system respectively display a corresponding image block for forming an entire image according to the combination positions of the display units when the display system is set to a combination display mode. The display method may take the form of a computer program product stored on a computer-readable storage medium having computer-readable instructions embodied in the medium. Any suitable storage medium may be used including non-volatile memory such as read only memory (ROM), programmable read only memory (PROM), erasable programmable read only memory (EPROM), and electrically erasable programmable read only memory (EEPROM) devices; volatile memory such as static random access memory (SRAM), dynamic random access memory (DRAM), and double data rate random access memory (DDR-RAM); optical storage devices such as compact disc read only memories (CD-ROMs) and digital versatile disc read only memories (DVD-ROMs); and magnetic storage devices such as hard disk drives (HDD) and floppy disk drives.

The display method is implemented by the display system which includes several electrical apparatuses. Each of the electrical apparatuses includes a display unit. In one embodiment, the display sizes of the display units are all the same. In another embodiment, the display sizes of some of the display units are the same. In another embodiment, the display sizes of the display units are different. In addition, the display units may be polygonal (e.g., rectangular) in shape.

The routine 300 for the display method starts at operation 320, where when the display system is set to a combination display mode, combination relations among the display units of the electrical apparatuses are detected and corresponding combination information is generated.

From operation 320, the routine 300 continues to operation 330, where each of the display units is controlled to display a corresponding image block according to the combination information. Hence, the displayed corresponding image blocks can be combined to form an entire image. Therefore, several electrical apparatuses with small display units can be combined to form a large display size, such that it is convenient for several persons to watch content displayed with the large display size.

Furthermore, at operation 340, when the display system is set to an independent display mode, the display units of the electrical apparatuses respectively display an independent image. In other words, when the display system is set to the independent display mode, the electrical apparatuses can display their own content.

In one embodiment of this invention, the routine 300 begins at operation 310, where a determination is made as to whether the display system is set to an independent display mode or a combination display mode. If the display system is set to an independent display mode, the routine 300 continues to operation 340, as described. However, if the display system is set to a combination display mode, the routine 300 continues to operation 320, as described above.

In one embodiment of this invention, the combination information can be generated according to the received order of signals received from the electrical apparatuses at operation 320. Hence, at operation 320, a confirm signal is received from each of the electrical apparatuses. Subsequently, the combination information is generated according to a receiving order of the confirm signals received from the electrical apparatuses. For example, the electrical apparatus, the confirm signal received from which is at the xth place, is assigned to the xth position to generate the combination information. Therefore, users can operate the electrical apparatuses for generating confirm signals in the order of their combination positions, and this information may be used to generate the combination information at operation 320.

In another embodiment of this invention, the electrical apparatuses may each display a diagram, which shows several candidate positions for selection, to perform operation 320. Hence, at operation 320, each of the display units of the electrical apparatuses is driven to display a diagram, which shows a plurality of candidate positions for selection. A select signal for selecting one of the candidate positions can be received from each of the electrical apparatuses. Subsequently, the combination information may be generated according to the select signals. Therefore, users can select the combination position for the electrical apparatuses in an easy way.

In another embodiment of this invention, the combination positions of the electrical apparatuses can be assigned randomly at operation 320. Hence, at operation 320, a random combination position is randomly assigned to each of the display units of the electrical apparatuses. Subsequently, the combination information is generated according to the random combination positions assigned to the display units. Furthermore, the display units may display the assigned combination positions so that users may subsequently place the electrical apparatuses in the correct positions.

In another embodiment of this invention, each of the display units may be a touch screen, and users can perform touch gestures that trace tracks, each across the edges of the display units of two neighboring electrical apparatuses, and the combination information may be generated at operation 320 using this touch gesture information. Hence, at operation 320, detection signals from the display units are received and corresponding touch gesture signals are generated which include times at which the touch gestures were made. Using the touch gesture signals, the combination information is generated by determining that touch gestures, which are made on two of the display units at times close to each other, are neighboring to each other. In other words, users can put the electrical apparatuses in a desired arrangement, and trace a track across the display units of neighboring electrical apparatuses at operation 320. In some embodiments, users can touch a single track across all the display units of the electrical apparatuses sequentially. Therefore, the combination information can be generated by simply touching at least one track on the display units of the electrical apparatuses.

In another embodiment of this invention, after the electrical apparatuses are put in a desired arrangement, information about which edges of the electrical apparatuses are touched is provided for executing operation 320. In detail, at operation 320, when the display system is set to the combination display mode, information about touched edges of the electrical apparatuses is received. Touch sensing units may be disposed on the edges of the electrical apparatuses to generate a signal when the corresponding edge is touched. The touch sensing units may be electricity-conducted metal, short range wireless transmission units (such as IrDA® units) or any other unit for sensing touch. Subsequently, the combination information is generated according to the touched-edge information. Therefore, users only have to put the electrical apparatuses in a desired arrangement with the edges of the electrical apparatuses touching each other for generating the combination information.

In addition, a touched position in relation to the entire image may be calculated according to an actually touched position on the display units. Hence, the routine 300 may further include, when the display system is set to the combination display mode and one of the display units is touched, receiving an actually touched position of the touched display unit. Subsequently, a touched position in relation to the entire image is calculated according to the information of the touched display unit, the combination information and the actually touched position. Therefore, users can touch the entire image displayed by several small-sized display units for operation. In other embodiments, several actually touched positions may be received to provide for calculating several touched positions, which should not be limited in this disclosure.

In addition, another apparatus can be utilized for interacting with the entire image displayed by the small-sized display units. Hence, the routine 300 may further include transmitting or receiving an interaction signal to or from at least one interaction apparatus for interacting with the entire image. The interaction signal may be transmitted or received through a wireless communication interface, such as Bluetooth®, IrDA®, IEEE 802.11 series, Wi-Fi®, ZigBee® or any other wireless communication interface. In one scenario of this invention, a user can use the interaction apparatus to interact with an entire image displayed utilizing the combination of the display units of the electrical apparatuses for an interactive game. For example, when an interactive game, such as Bridge Card, Laying Out Sevens, Mahjong or any other interactive game, is being played, the interaction apparatus may display cards on a user's hand, and the entire image displayed utilizing the combination of the display units may display cards on the table. In other embodiments, the interaction apparatus may interact with the entire image combined utilizing other methods, which should not be limited in this disclosure.

The present invention can achieve many advantages. Several electrical apparatuses with small display units can be combined in any order to form a large display size. Hence, it is convenient for several persons to watch content displayed with the large display size. In one scenario of this invention, users can respectively provide their own electrical apparatuses for forming the large display size.

Although the present invention has been described in considerable detail with reference to certain embodiments thereof, other embodiments are possible. Therefore, the spirit and scope of the appended claims should not be limited to the description of the embodiments contained herein. It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A display system comprising:
a plurality of electrical apparatuses, wherein each of the electrical apparatuses comprises a display unit, wherein each of the display units is a touch screen; and
a display control unit building connections with the electrical apparatuses, wherein the display control unit comprises:
an information generating module for detecting and generating combination information about combination relations among the display units of the electrical apparatuses when the display system is in a combination display mode;
a display driving module for driving each of the display units to display a corresponding image block according to the combination information, such that the displayed corresponding image blocks are combined to form an entire image;
a touched-position receiving module for receiving detection signals from the display units and generating corresponding touch gesture signals which include times, at which the touch gestures were made, when the display system is in the combination display mode, wherein when the display system is in the combination display mode and one of the display units is touched, the touched-position receiving module receives an actually touched position of the touched display unit; and
a position calculating module for calculating a touched position in relation to the entire image according to the information of the touched display unit, the combination information and the actually touched position;
wherein the information generating module uses the touch gesture signals to generate the combination information by determining that touch gestures, which are made on two of the display units at times close to each other, are neighboring to each other.

2. The display system of claim 1, wherein each of the display units of the electrical apparatuses displays an independent image when the display system is in an independent display mode.

3. The display system of claim 1, wherein the display control unit further comprises:
an order receiving module for receiving a confirm signal from each of the electrical apparatuses when the display system is in the combination display mode,
wherein the information generating module generates the combination information further according to a receiving order of the confirm signals.

4. The display system of claim 1, wherein the display control unit further comprises:
a position display module for driving the display unit of each of the electrical apparatuses to display a diagram, which shows a plurality of candidate positions, when the display system is in the combination display mode, such that a select signal for selecting one of the candidate positions is received from each of the electrical apparatuses,
wherein the information generating module generates the combination information further according to the select signals.

5. The display system of claim 1, wherein the display control unit further comprises:
a randomly assigning module for randomly assigning a random combination position to each of the display units when the display system is in the combination display mode,
wherein the information generating module generates the combination information further according to the random combination positions assigned to the display units.

6. The display system of claim 1, wherein the display control unit further comprises:
a touched information receiving module for receiving information about touched edges of the electrical apparatuses when the display system is in the combination display mode,
wherein the information generating module generates the combination information further according to the touched-edge information.

7. The display system of claim 1 further comprising:
at least one interaction apparatus for building a connection with the display control unit and for receiving or transmitting an interaction signal from or to the display control unit for interacting with the entire image.

8. A display method implemented by a display system comprising a plurality of electrical apparatuses, wherein each of the electrical apparatuses comprises a display unit, the display method comprises:
(a) when the display system is set to a combination display mode, detecting and generating combination information about combination relations among the display units of the electrical apparatuses, wherein each of the display units is a touch screen, the operation (a) comprises:
receiving detection signals from the display units and generating corresponding touch gesture signals which include times at which the touch gestures were made; and
using the touch gesture signals to generate the combination information by determining that touch gestures, which are made on two of the display units at times close to each other, are neighboring to each other; and
(b) driving each of the display units to display a corresponding image block according to the combination information, such that the displayed corresponding image blocks are combined to form an entire image;
when the display system is set to the combination display mode and one of the display units is touched, receiving an actually touched position of the touched display unit; and
calculating a touched position in relation to the entire image according to the information of the touched display unit, the combination information and the actually touched position.

9. The display method of claim 8 further comprising:
when the display system is set to an independent display mode, displaying an independent image on the display unit of each of the electrical apparatuses.

10. The display method of claim 8, wherein the operation (a) further comprises:
receiving a confirm signal from each of the electrical apparatuses; and
generating the combination information further according to a receiving order of the confirm signals.

11. The display method of claim 8, wherein the operation (a) further comprises:
driving the display unit of each of the electrical apparatuses to display a diagram, which shows a plurality of candidate positions for selection;
receiving a select signal for selecting one of the candidate positions from each of the electrical apparatuses; and
generating the combination information further according to the select signals.

12. The display method of claim 8, wherein the operation (a) further comprises:
randomly assigning a random combination position to each of the display units; and
generating the combination information further according to the random combination positions assigned to the display units.

13. The display method of claim 8, wherein the operation (a) further comprises:
receiving information about touched edges of the electrical apparatuses when setting to the combination display mode; and
generating the combination information further according to the touched-edge information.

14. The display method of claim 8 further comprising:
receiving or transmitting an interaction signal between at least one interaction apparatus for interacting with the entire image.

* * * * *